Oct. 5, 1965 S. W. BARKER 3,209,562
PICK-UP ROLLS IN THREAD TREATING MACHINES
Filed Dec. 19, 1961 7 Sheets-Sheet 2

Oct. 5, 1965  S. W. BARKER  3,209,562
PICK-UP ROLLS IN THREAD TREATING MACHINES
Filed Dec. 19, 1961  7 Sheets-Sheet 6

Oct. 5, 1965  S. W. BARKER  3,209,562
PICK-UP ROLLS IN THREAD TREATING MACHINES
Filed Dec. 19, 1961  7 Sheets-Sheet 7

# United States Patent Office 3,209,562
Patented Oct. 5, 1965

3,209,562
PICK-UP ROLLS IN THREAD TREATING MACHINES
Sydney Warren Barker, Colne, England, assignor to Nelvale Limited, Nelson, England, a British company
Filed Dec. 19, 1961, Ser. No. 160,536
Claims priority, application Great Britain, Feb. 28, 1961, 7,214/61
27 Claims. (Cl. 68—176)

This invention relates to thread treating machines of the kind commonly known as thread storing, thread advancing machines in which thread or yarn to be treated is looped a number of times round long rolls mounted on nearly parallel axes and driven at the same circumferential speed, the axes of the rolls being mutually inclined so as to give a convenient pitch or forward traverse between successive loops of the thread. The thread may be a viscose yarn drawn from a spinning jet in a coagulating bath onto the input ends of the rolls and delivered from the output ends to a bobbin on which it is wound or to any other device to which it is desired to pass the thread forward.

In machines of the above general kind, the thread is usually looped round a pair of rolls placed one above the other, and it is customary to apply various treatment liquors to the thread as it passes round the rolls. This has normally been done by feeding the treatment liquors to jets located above the lower roll at appropriate intervals along its length. Such arrangements, however, suffer from the disadvantage that the treatment liquors tend to spread along the rolls and to intermingle so as to reduce the effectiveness and efficiency of the treatment processes.

Attempts to prevent the spread of liquor along the rolls have included the formation of short skew or helical grooves, arranged in circumferential bands around the rolls at the intended boundaries of the several treatment zones, the "hand" of the grooves in each band being such as to simulate the action of a screw thread type liquid seal. Gapped flanges and non-wetting zones have also been tried for preventing the spread of the treatment liquor but none of these expedients has been found entirely satisfactory. This is largely due to the tendency of the liquors to accumulate on the surfaces of the rolls.

In the specification and drawings of co-pending patent application No. 139,188 filed September 19, 1961, there is disclosed a machine embodying an improved method by which the treatment liquors are applied to the thread. This involves the provision of one or more treatment rolls on a common axis between and generally parallel to, but lower than, the axes of the main thread storing rolls, and which are partly immersed in treatment liquors and also run in contact with the undersides of successive loops of the thread on its passage between the main rolls of the machine. In this manner the liquors are applied separately to the thread in small quantities, and cannot spread along a continuous treatment roll surface.

If the main roll of the thread storing and advancing machine immediately following the treatment roll (considered in the direction of running of the thread between rolls) is small in diameter, thus having a high angular velocity, any excess liquor picked up by the thread will be thrown off by centrifugal action. This opposes both the accumulation of liquor on the main roll, and any tendency for liquors to spread and intermingle on this roll surface.

If the treatment roll referred to above is a plain cylinder, the angle of contact between it and the thread must be small if the roll is not to interfere with the free traverse along the main rolls of a starting up band or thread wrapper. However, if the roll is tapered or stepped at the ends, the arrangement permits of a greater arc of contact between the thread and the roll whilst permitting free traverse of the starting up band or thread wrapper. On the other hand, when normally running in its generally helical path the thread in contact with the tapered or stepped portion of the treatment roll is subject to extra friction, since the surface speed of the tapered or stepped portions of the roll will be less than the normal thread speed.

The present invention aims at overcoming this defect in that while undergoing treatment the thread will run in contact with a circumferential surface of a treatment roll having substantially the same tangential speed as the thread speed throughout the roll width; and also provides a means whereby the threads may be treated by contact with the wetted upper part of a roll which dips into the treatment liquor, or may be taken down by the roll and passed through the treatment liquor.

The present invention is a development of that described in the said co-pending application in that means is provided on that end face or edge of each treatment roll with which the advancing starting up band or thread wrapper first makes contact for engaging or picking up the band and carrying it onto the roller surface without frictional drag. The pick-up formation may be a hook, narrow ledge or a gap in a flange, or a combination of both.

Where the orientation of the treatment roll is such that the advancing band lies parallel to the plane of the end face of the roll, the latter may be provided with a ward or deflector formation adapted to bear against the band over that arc of rotation of the roll when the pick-up formation is to be traversed idly past the line of the thread before reaching its next operative position. The ward or deflector serves to deflect the starting up band (or a loop or convolution of the thread which has experienced a random lateral displacement) and prevent accidental pick-up thereof on the wrong side of the roll.

Where it is desired to vary the spacing of adjacent loops of the thread on the treatment roll, the latter may be mounted on an axis which is appropriately angled to the direction of travel of the thread. Thus, as the thread traverses the angled treatment roll, successive loops are spaced apart at greater or less intervals than those determined by the skewing of the axes of the main rolls of the machine.

When a treatment roll is angled so as to spread the loops apart it is usually unnecessary to provide a deflector formation as outlined above, since that arc of the treatment roll over which the pick-up formation ineffectively crosses the line of the advancing band is further from the band than the operative arc, and the risk of accidental pick-up is minimised.

Instead of mounting the treatment rolls on an axis below the level of the lower common tangent to the main rolls so that the treatment roll wets the thread as the latter passes over the upper circumference of the roll, the roll axis may lie above the said tangent so that the thread is carried down into the successive treatment baths.

Practical embodiments of the present invention will now be described by way of example only with reference to the accompanying drawings in which.

Throughout the drawings, parts performing similar functions have reference numerals differing only by the hundred series.

Figure 1:
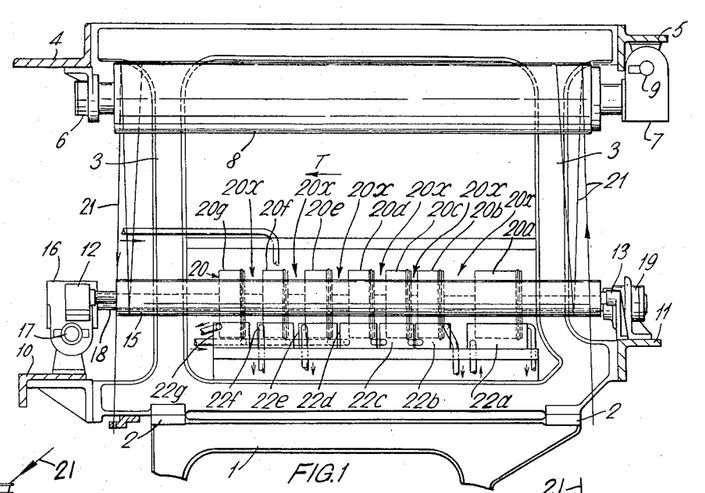
FIGURE 1 is a side elevation of the upper part of a machine according to the invention in which the thread is carried down into the treatment liquor baths.
Figure 1A:
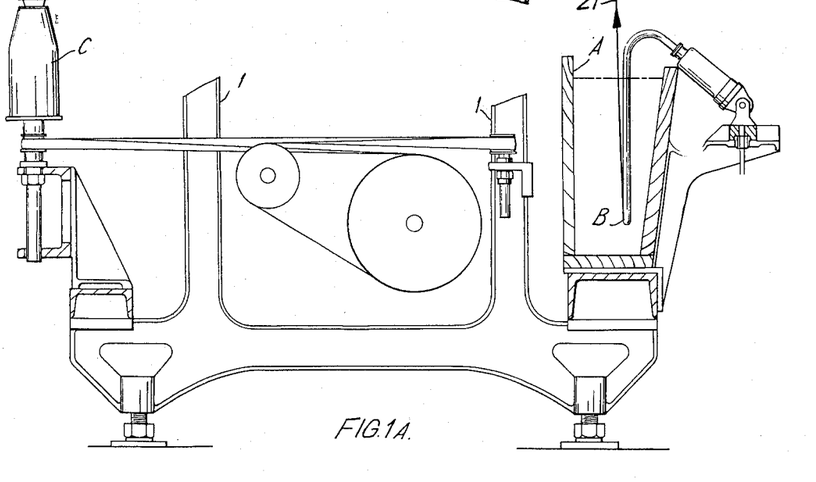
FIGURE 1A shows the lower part of the machine of FIGURE 1.
Figure 2:
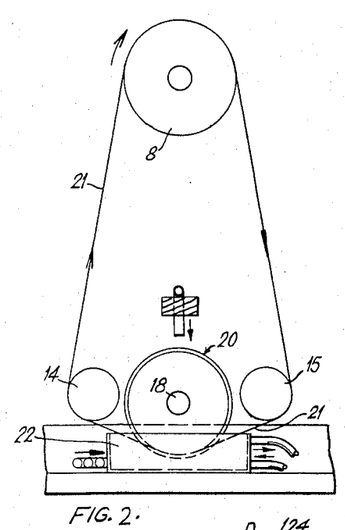
FIGURE 2 is a fragmentary end elevation of FIGURE 1.

FIGURES 1, 1A and 2 of the drawings illustrate one unit of a multi-spindle viscose thread storing machine of generally known design in which an elongated cast iron bed 1 has seatings 2 for end frames 3. Also extending along the right-hand side (FIGURE 1A) of the bed below the level of the frame seatings 2 is a conventional coagulating bath A into which dip the usual spinning jets B, one for each set of rolls, whilst along the other side of the bed 1 are arranged the customary bobbins and spindles C for the treated thread.

The upper ends of the end frames 3 are connected by longitudinal girders 4, 5 which carry bearings 6, 7 for the upper main rolls 8 of each unit, the bearing 7 being part of a driving gear assembly having a power input shaft 9 extending for the length of the girder 5. Beneath the girders 4, 5 are similar girders 10, 11 bolted to the lower ends of the frames 3 and carrying bearings 12, 13 for lower main rolls 14, 15 of smaller diameter than the roll 8, two rolls 14, 15 being placed beneath each roll 8. The bearings 12 form part of a drive input housing 16, all the latter being interconnected by a common drive shaft 17.

Between each pair of lower main rolls 14, 15 is a treatment roll unit consisting of a driven shaft 18 supported at one end in bearings in the housing 16 and at the other end in a bearing 19 on the girder 11 and carrying a group 20 of individual treatment rolls or sections which lie between the lower main rolls 14, 15. These individual treatment rolls or roll sections are referenced 20a . . . 20g in FIGURE 1, and each section dips into a respective treatment liquor trough or bath 22a . . . 22g. The group of rolls 20 may be constituted by separate rolls keyed at intervals along the shaft 18, or by axially spaced land portions of a single roll, successive rolls or sections in either case being separated by deep radial gaps or grooves 20x. The nature of the liquors in the various baths 22 will depend on the treatment to which the thread is to be subjected. Such treatments may include extra acid treatment, washing, bleaching, desulphuring, colouring or dyeing, and applying finishing materials—not necessarily in that order. In a practical example of a thread treatment machine, successive troughs contain acid, first and second washing water, bleach, third and fourth washing water, and a finishing liquor such as a soap solution or oil emulsion.

In the course of its travel from end to end of the main rolls 8, 14, 15 the thread 21 makes many loops at fairly closely spaced intervals, and is normally initially laid on the rolls by a conventional starting up band or thread wrapper, which is an endless band (shown at W in FIGURES 12 and 13) wrapped taut around the three main rolls in a triangular configuration (FIGURE 2). This band W then travels slowly along the rolls, the leading end of the thread being attached to it. As it encounters the first treatment roll section 20a, the band is stretched and forced to ride up on the circumference of the roll 20a. The attached thread 21 then follows in the path set by the band, and since all the rolls 8, 14, 20a . . . 20g are driven at the same peripheral speed, no additional stretching action is exerted on the thread 21 itself.

In order to enable the band W to be picked up with a minimum of friction or abrasion against the lead-in end of a treatment roll, the present invention provides a pick-up formation which will be more specifically described below. The same consideration applies in the case where the thread 21 passes over the top of the treatment rolls, in the manner illustrated in FIGURES 8 and 9 (see below). The present invention is applicable to both types of thread path.

Figure 3:
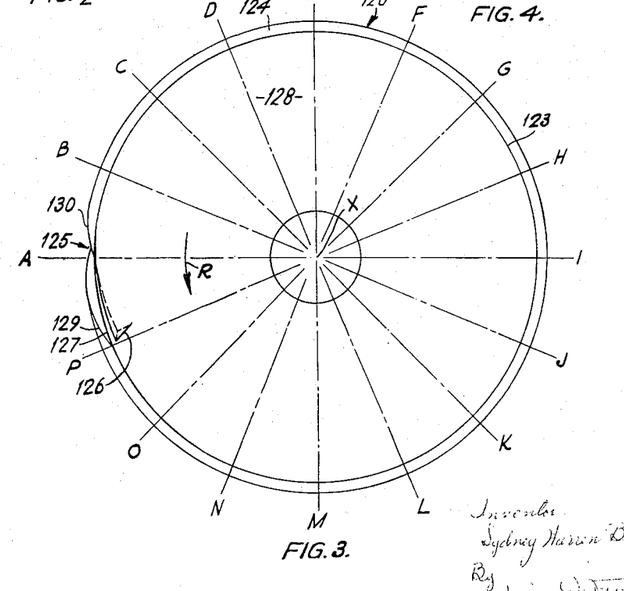
FIGURE 3 is an end view of a first form of treatment roll.
Figure 4:
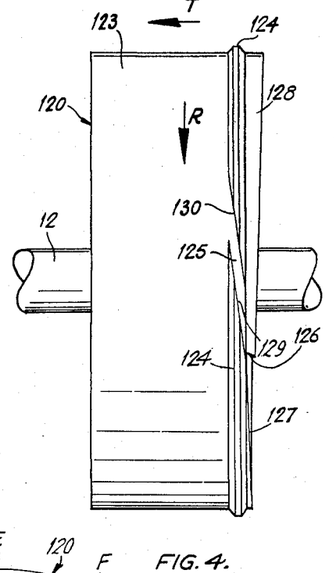
FIGURE 4 is a side view of the roll of FIGURE 3.
Figures 5, 6, 7:
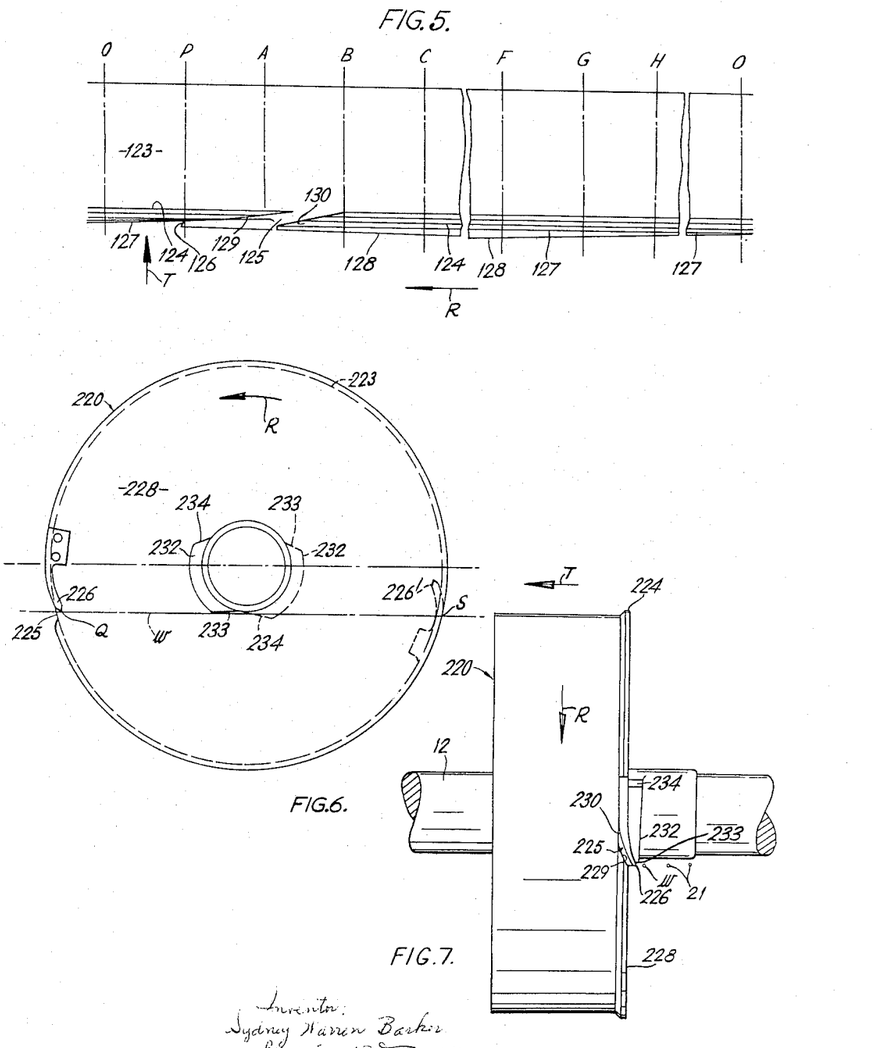
FIGURE 5 is a developed diagram of the circumference of the roll of FIGURES 3 and 4.
FIGURE 6 is an end view of a modified form of treatment roll.
FIGURE 7 is a side view of the roll of FIGURE 6.

Referring now to FIGURES 3–5, a first form of treatment roll 120 has a cylindrical circumferential thread treatment surface 123 bounded at the lead-in end by a substantially trapezoidal section flange 124. This flange is gapped obliquely at 125, the direction of this gap being as shown in FIGURES 4 and 5 when the direction of rotation of the roll 120 is as indicated by the arrow R in FIGURES 3–5. The entrance to the gap 125 is preceded by a laterally projecting narrow ledge or hook 126 formed by the abrupt end of a helical chamfer or ratchet-like formation 127 on the lead-in end face 128 of the roll where it meets the circumferential thread treatment surface 123. This helical chamfer 127 is shown more clearly in the developed diagram of FIGURE 5, where the chain lines A . . . P represent the intersections with the cylindrical circumferential surface 123 of corresponding radial planes XA . . . XP as shown in FIGURE 3. The chamfer 127 first increases the effective width of the roll 120 up to the plane F and then reduces it smoothly through G to a minimum at A. At approximately the plane L, it begins to reduce the width of the flange 124, and between the planes P and A the flange 124 is itself chamfered more obliquely than the edge 127, as shown at 129. This latter chamfer 129 constitutes the leading boundary of the gap 125 and is parallel to a complementary chamfer 130 forming the trailing boundary of the gap 125, the width of which is considerably greater than the diameter of the thread it is required to lead onto the cylindrical surface 123. The chamfers are shown exaggerated in FIGURES 4 and 5 for purposes of illustration only.

In operation, as the roll 120 rotates and the starting up band or thread wrapper advances in the direction of the arrow T (FIGURES 4 and 5), the narrow ledge or hook 126 picks up the adjacent band, and the chamfered walls 129, 130 of the flange 122 guide it through the gap 125 therein and lay it on the cylindrical surface 123 inside the flange 124. Thus, the band is transfered onto the roll 120 without frictional rub against the end face 128 thereof.

Since the pitch of the thread loops on the main rolls 8, 14, 15 is very small the loop immediately adjacent the lead-in end of the roll 120 is substantially parallel to the radial plane containing the end face 128 of the roll. Hence there is a risk that the band will not be picked up when the narrow ledge or hook 126 is in the correct position—i.e. descending past the thread 21 for the machine of FIGURES 1 and 2—but may be picked up when the narrow ledge or hook 126 is in the complementary position approximately half a revolution later. If this were to happen, the starting band would be laid on top of the roll, whose surface 123 is then moving in the opposite direction to the direction of travel of the thread around the main rolls 8, 14, 15. This would result in fracture of the starting up band.

In order to prevent this happening, a ward or deflector must be provided to deflect the adjacent band away from the face 128 of the roll before it crosses the path of the narrow ledge or hook 126 on the upward sector of its travel relative to the band. In the pick-up roll illustrated in FIGURES 3-5 the portion of the end chamfer 127 between the planes XA and XF acts as the ward or deflector.

Another such device is shown in FIGURES 6 and 7, which illustrate a slightly simplified version of that shown in FIGURES 3-5 and has the trailing chamfered wall 230 of the gap 225 formed on a separate narrow ledge or hook 226 bolted to the end face 228 of the roll, this hook forming an outwardly flared continuation of the flange 224. The position of the starting up band to be picked up is shown at w. For correct operation, the band must be picked up at Q, but not at S (FIGURE 6). A face cam 232 is secured on the boss of the roll 220, its leading edge 233 crossing the line w of the starting up band just behind the tip of the hook 226 when the latter is at the correct pick-up position Q, and its trailing edge 234 crossing the same line just behind the hook 226 when the latter reaches the point S (FIGURE 6). In this way, the face cam 232 deflects the band away from the roll 220 from the instant when the hook 226 has just failed to pick up correctly at Q to an instant after the hook 226 has cleared the incorrect pick-up position S, as indicated by the dotted position of the hook at 226'.

Figure 8:
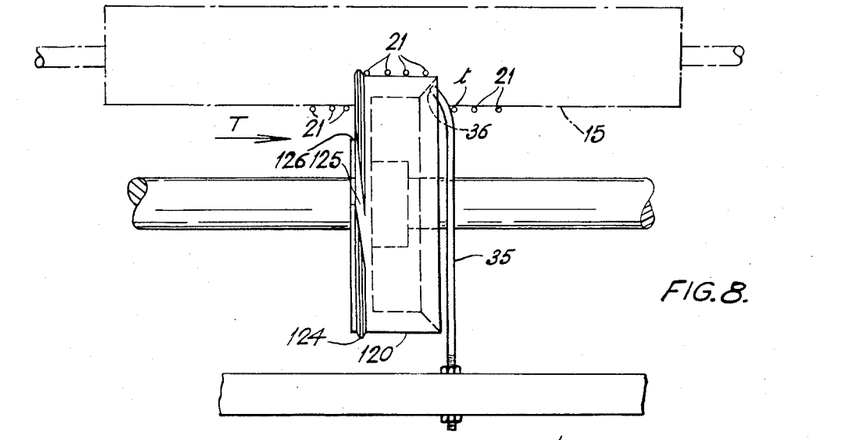
FIGURES 8 and 9 are fragmentary side and end views, respectively, of a machine similar to FIGURES 1 and 2, of a machine in which the thread passes over the treatment roll.
Figure 9:
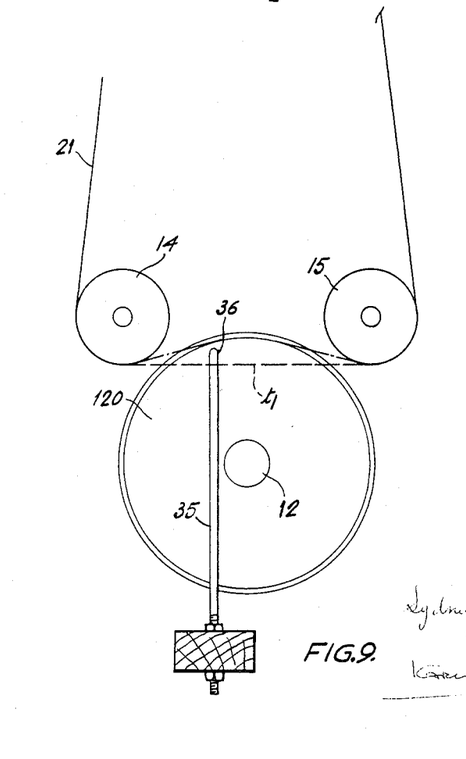

It is also desirable to avoid rubbing of the thread 21 against the discharge end of the roll 20 when the thread leaves it, and FIGURES 8 and 9 illustrate one form of deflector for ensuring that this does not occur. The machine shown is one in which the thread passes over the top of the treatment rolls 120, but the device is equally applicable where the thread passes under them. The deflector consists of an upright rod 35 bent over at its upper end so that its tip 36 lies within a recess at the discharge end of the roll 120. As the last thread loop treated leaves the roll 120, it resumes the line t in which it is tangential to both lower main rolls 14, 15, and in doing so it is pushed away from the roll 120 by the bent upper end of the rod 35. The rod 35 is smooth and highly polished to reduce friction to a minimum.

Figure 10:
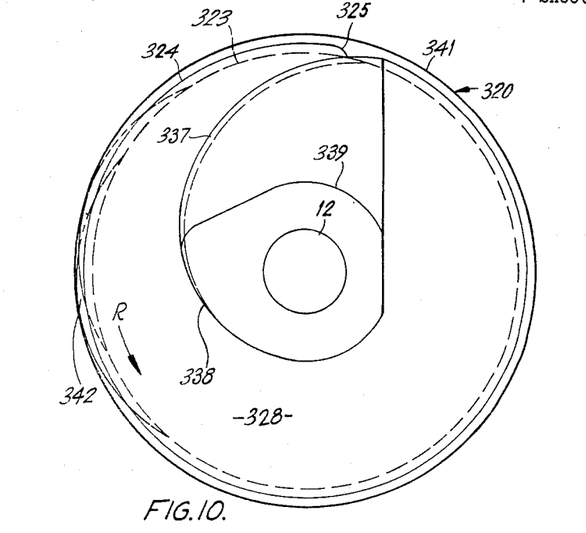
FIGURE 10 is an end view of another modified form of treatment roll.
Figure 11:
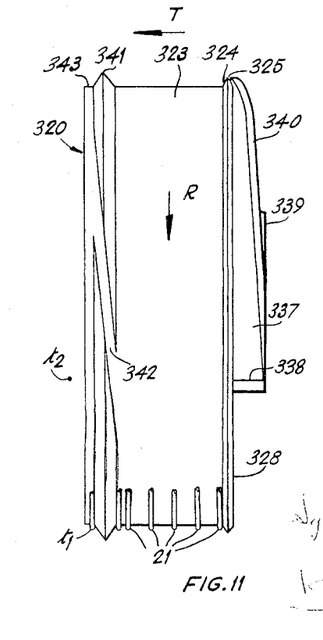
FIGURE 11 is a side view of the roll of FIGURE 10.

The roll 320 shown in FIGURES 10 and 11 has both lead-in or pick-up and discharge or run-off end deflectors of different design from those already described. Considering first the pick-up or lead-in end 328 of the roll, the band is picked up on a laterally projecting, backwardly curved, narrow ledge or hook formed by an asymmetrical scroll formation 337 which springs at 338 from a central cam-shaped boss 339. A shallow outer wall 340 on the asymmetrical scroll formation converges in the axial direction on the gap 325 in the flange 324 which bounds the thread treating surface 323, and the peripheral edge of the scroll formation blends smoothly into this treatment surface at the gap 325. The cam-shaped boss 339 has a plane end face which acts in the same manner as the face cam 232 in FIGURES 6 and 7 to prevent incorrect pick-up by the start 338 of the scroll-shaped ledge 337.

Near the discharge end of the surface 323 is another flange 341 of triangular section, its base being approximately of the same order of width as the spacing between loops of the thread 21. The flange 341 is gapped obliquely at 342, and beyond it lies a narrow cylindrical surface 343 of adequate width to support a loop of thread, as indicated at $t_1$ in FIGURE 11. The action of the gapped flange 341 is to constrain the last loop $t_1$ to run almost on the edge of the roll 320, so that the next loop $t_2$ will be well clear of the roller end surface.

In a conventional thread treatment machine as normally operated, the endless thread starting band or wrapper tends to traverse the rolls at a greater speed than will allow the normal loop pitch to be established immediately behind it. This phenomenon is observed to an even greater degree in machines according to the present invention. The effect is illustrated in FIGURES 12 and 13 of the accompanying drawings, where stages in the laying of the thread on the rolls 14, 15 of a conventional thread storing and advancing machine are shown diagrammatically.

Figure 17:
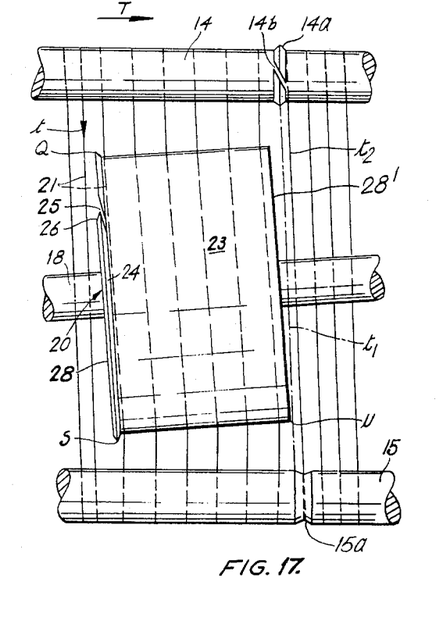
FIGURE 17 is a plan view of a treatment roll skewed in relation to a pair of adjacent main rolls in the sense for increasing the spacing between successive thread loops in contact therewith.

It should be noted that, for convenience and clarity of illustration only, the rolls 14, 15 in FIGURE 17 are drawn parallel to each other, and one side only of each loop is shown. This side is drawn at 90° to the axes of the rolls. In practice, not only will the axes of the rolls 14, 15 converge at a small angle but, when the rolls are full of thread, the line of the thread in each loop will be determined by the setting of the rolls.

Figure 12:
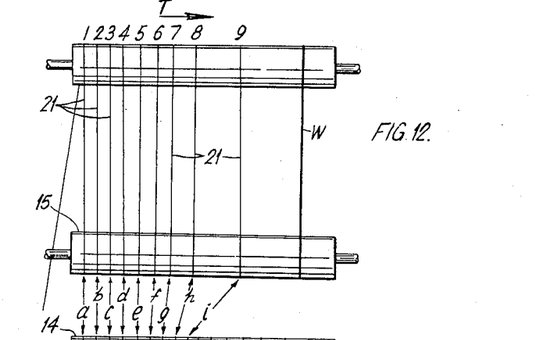
FIGURE 12 is a schematic side view of a pair of main rolls over which some loops of thread have been laid.

In FIGURE 12, the endless starting up band W has nearly completed its travel, in the direction of the arrow T, along the rolls 14, 15 and the thread loops 21 are spaced out behind it, giving very wide spaces immediately behind the starting up band W with the spacings becoming narrower as the loops gradually take up the normal pitch determined by the angle of convergence of the axes of the rolls 14, 15. This is the normal situation which develops on starting up, particularly if the starting up band W is thick or broad compared with the thread, and even more so if the thread loops and starting up band carry excess liquor along with them.

Figure 13:
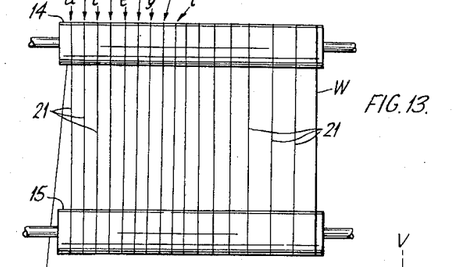
FIGURE 13 is a view similar to FIGURE 12 showing an almost full complement of thread loops on the rolls.
Figure 14:
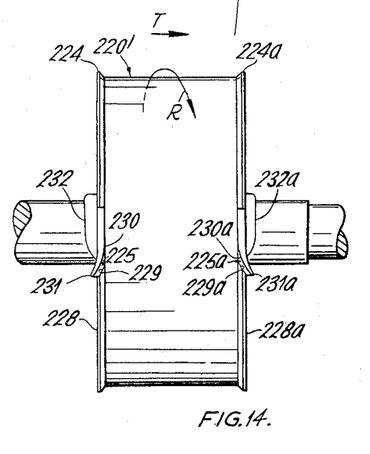
FIGURE 14 is a side view of another form of treatment roll primarily intended to meet the conditions illustrated in FIGURES 12 and 13.
Figure 15:
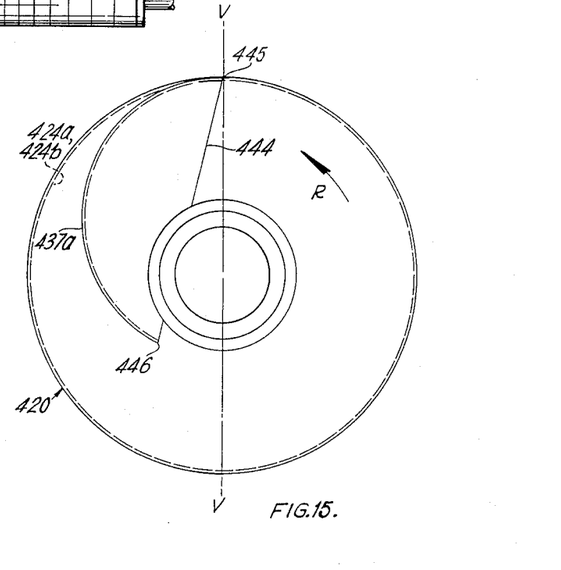
FIGURE 15 is an end view of a further modified form of treatment roll.
Figure 16:
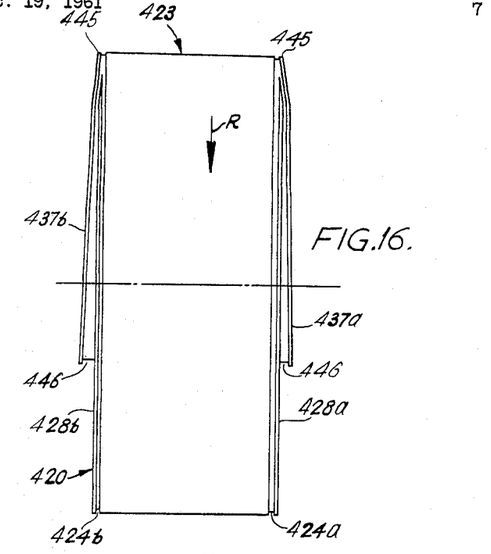
FIGURE 16 is a side view of the treatment roll of FIGURE 15.

FIGURE 13 shows the conditions a little later when the band W has reached the end of the rolls 14, 15 and has been held in that position to allow more loops to develop. Normal spacing has now been formed over the greater part of the rolls, and a few more loops will completely fill the rolls so that the starting up band W can be taken off and the thread 21 taken forward to the bobbin C (FIGURE 1A). The positions of some of the corresponding loops in the two figures are indicated by the referenced double-headed arrows between them. It will be noted that whereas the loop positions a-e have not moved perceptibly, position f has moved slightly backwards—i.e. to the left—and positions g-i have moved backwards to increasing extents. FIGURES 14-16 show how a treatment roll 20 according to the present invention can be constructed in the forms of rolls 220' or 420 to accommodate these backward movements of the loop positions.

Referring now to FIGURE 14, the treatment roll 220' shown therein closely resembles that shown in FIGURES 6 and 7 except that the run-off or discharge end 228a thereof has a thread pick-up formation 224a, 225a, 229a, 232a which is a mirror image of that at the input end 228, the direction of rotation being shown by the arrow R and the direction of thread advance being shown by the arrow T. The parts of the pick-up formation at the discharge end 228a operate in the same way as those at the input end 228, as described above.

In operation, the starting up band traverses the main rolls 14, 15 at a relatively steady speed, normally in excess of that required for the formation of the final stable number of loops, as already explained. As it passes across the treatment roll shown in FIGURE 14, it rides over the flange 224a and thereafter passes beyond the range of pick-up by the discharge end hook or ledge 231a. As the following loops are formed, however, their positions move back (against the direction of thread traverse T), as described with reference to FIGURES 12 and 13, and eventually a loop will move into the path of the discharge end hook or ledge 231a. This loop is now picked up by the hook and placed on the treatment roll 220'. The operation will be repeated until the loop positions are stabilized throughout the lengths of the main rolls 14, 15.

Obviously, other forms of double pick-up formation can be used if desired. For example, each of the rolls of FIGURES 3–5 or FIGURES 10 and 11 may have mirror-image formations at each end of the thread-treating circumference. Alternatively, each of the pick-up formations can be used in conjunction with one of the others as a double pick-up formation.

FIGURES 15 and 16 show a modification of the arrangement of FIGURE 14. In FIGURES 15 and 16, a treatment roll 420 has a narrow ledge or hook constituted by an asymmetrical scroll-shaped ledge formation 437a, 437b at each end. These formations are similar in shape and in orientation with respect to the vertical axial plane V—V (FIGURE 15), each consisting of a segment lying in a plane which is tilted at a small angle to that of the respective end face 428a, 428b of the roll 420 so that one end 445 of the chord 444 bounding the segment meets the respective end plane at the circumference of the roll 420, the arcuate peripheral edge of the segment blending smoothly into the treatment surface 423.

The other end 446 of the chord 444 stands proud of the respective end face 428a, 428b by an amount slightly less than one loop pitch of the thread and constitutes a pick-up formation, the whole segment thus acting as a combined pick-up and ward or deflector. The arcuate peripheral edge of each segment is a ledge or groove which runs into another circumferential groove 424a or 424b, as the case may be, bounding the treatment surface 423. Each groove 424a, 424b is relatively shallow, and is of a width and depth which conveniently accommodates a thread loop.

The action of each groove is to control the position of the first and last loop of thread being treated on the roll 420, and the operation of the roll is substantially similar to the arrangement of FIGURE 14. The construction, however, is less vulnerable to accidental damage than those previously described using the type of flange 24 for the control of the end loops of thread, and is also cheaper to manufacture.

FIGURE 17 shows how a treatment roll 20 can be mounted so as to vary the pitch of the thread loops 21. In this figure the shaft 18 is angled slightly (the angle is exaggerated in the drawings for the purpose of illustration) with respect to the bottom main rolls 14, 15, and the thread 21 passes beneath the treatment roll 20. Pick-up of the adjacent advancing loop $t$ must occur at the point Q on the roll. Since, in FIGURE 17, the plane of the end face 28 of the roll 20 lies at a greater angle to the axes of the bottom main rolls 14, 15 than the pitch angle of the thread 21, the position S of incorrect pick-up is further from the loop $t$ than the position Q of correct pick-up, so that there is no need for a ward or deflector cam such as that shown at 232 in FIGURES 6 and 7.

The skew of the roll 20 causes the thread loops 21 in contact therewith to be spaced apart more narrowly.

It has been found that the spacing between successive loops of the thread in a machine of the kind described herein tends to be erratic, especially immediately following the endless thread starting band. Each treatment roll is designed to accommodate a certain number of thread loops in order that the appropriate treatment may be satisfactorily given to the thread, and hence means is required for ensuring the formation of the correct number of loops on each treatment roll section at the time of initial laying by the thread band or wrapper, or for automatic adjustment of the loop positions to accommodate small variations in the steady loop distribution during normal operation.

The present invention aims at establishing such a condition by providing, on the discharge end of each treatment roll 20, a formation which may be similar to the pick-up formation at the input end but of the opposite hand so that a loop lying just off the roll but tending to rub against or touch the discharge end of the roll is picked up and placed on it.

At both the input and the discharge ends of a treatment roll, it is possible for a loop to be positioned very close to the roll but not sufficiently to be picked up by the formation and placed on the roll. This is undesirable, since any slight rubbing action of a thread against the moving edge of the roller may damage the thread. It is found that this trouble may be overcome, as indicated schematically in FIGURE 17, by forming a small flange 14a or a shallow groove 15a on one or more of the main rolls 14, 15 so that a loop tending to run at the position $t_1$ in which it would just touch the end of the treatment roll at U is deflected to the position shown at $t_2$. The flange 14a or groove 15a is small enough not to interfere with the passage of the endless starting up band, and only very slightly affects the lateral movement of a single loop, but is sufficient to locate a loop at up to about one normal loop pitch out of position. If a loop is more than about one pitch out of position then it will cross the flange, which may be gapped as shown at 14b to facilitate this action. The flanges 14a or grooves 15a are so positioned that if the thread runs on one side thereof it is free of a treatment roll, whilst if it crosses the flange or groove it is then in sufficient contact with the treatment roll that it must be picked up by the respective thread pick-up formation.

In all the forms of treatment roll 20 described above, a plain cylindrical treatment surface 23 has been assumed, but it is to be understood that coned or stepped surfaces may be used where careful control of the tension of the thread or yarn is necessary. Grooved surfaces may also be used if desired. Similarly, the main rolls 8, 14, and 15 may be stepped or tapered at appropriate sections of their lengths so as to apply stretch to the yarn in known manner while it is being guided round the rolls.

I claim:

1. A treatment roll for a thread storing thread advancing machine having main rolls rotatable on nearly parallel axes for storing the thread in closely spaced loops wherein at least one end of the treatment roll has a loop pick-up formation thereon for positively engaging the adjacent approaching loop.

2. In a thread storing thread advancing machine having a pair of main rolls on nearly parallel axes over which thread is laid in closely spaced loops, an intermediate treatment roll whose periphery is engageable with at least some of the loops and a pick-up formation on at least one end of the said treatment roll for engaging an adjacent loop and laying it on the roll circumference.

3. A thread storing thread advancing machine having a pair of main rolls on nearly parallel axes over which thread is laid in closely spaced loops, an intermediate treatment roll whose periphery is engageable with at least some of the loops, and a loop pick-up and positioning means comprising a hook formation on the circumferential edge of at least one end of said treatment roll for engaging an adjacent loop, said hook formation facing in the direction of rotation of said treatment roll and projecting outwards from said end.

4. In a thread storing thread advancing machine having a pair of main rolls on nearly parallel axes over which thread is laid in closely spaced loops, an intermediate treatment roll whose periphery is engageable with at least some of the loops and a pick-up and positioning means including a helical ratchet-like formation on the circumferential edge of at least one end of said treatment roll for engaging an adjacent loop, the step of said formation projecting outwards from said end in a line substantially parallel to the axis of said treatment roll.

5. In a thread storing thread advancing machine having a pair of main rolls on nearly parallel axes over which thread is laid in closely spaced loops, an intermediate treatment roll whose periphery is engageable with at least some of the loops and a loop pick-up formation projecting outwards from at least one end of said treatment roll in a direction generally parallel to the axis of said roll and blending smoothly into the circumferential surface of said treatment roll.

6. In a thread storing thread advancing machine having a pair of main rolls on nearly parallel axes over which thread is laid in closely spaced loops, an intermediate treatment roll whose periphery is engageable with at least some of the loops and a loop pick-up formation on at least one end of said treatment roll comprising a scroll-shaped ledge projecting laterally from said end and extending in a curved path from a point near the axis of said treatment roll to a point on the circumference thereof and concave to said axis.

7. In a thread storing thread advancing machine having a pair of main rolls on nearly parallel axes over which thread is laid in closely spaced loops, an intermediate treatment roll whose periphery is engageable with at least some of the loops and a loop pick-up formation on at least one end of said treatment roll comprising a central boss projecting laterally from said end and a curved ledge extending from a point on the periphery of said boss to a point on the circumference of said treatment roll in an arc blending smoothly into said boss periphery and said roll circumference.

8. A device according to claim 7 wherein said curved ledge is constituted by the circumferential edge of a plane segmental projection on said end of said treatment roll, the thickness of said projection decreasing progressively with increase of radial distance from the axis of said treatment roll.

9. In a thread storing, thread advancing machine having a pair of main rolls on nearly parallel axes over which thread is laid in closely spaced loops, an intermediate treatment roll rotatable on an axis parallel to the mean axis of said main rolls and circumferentially engageable with at least some of the loops, said treatment roll having a loop pick-up formation on at least one end thereof, and a deflector located in the path of the loop adjacent said end for preventing incorrect pick-up of the loop by said formation at any point in its circular path of travel other than a predetermined point.

10. A device according to claim 9 wherein said deflector is constituted by a central boss on said end of said treatment roll and having an arcuate edge concentric with the axis of rotation of said treatment roll and of a radius greater than the perpendicular distance between said loop and said axis of rotation, said arcuate edge extending for a circumferential distance at least as great as the arc cut off by said loop as chord.

11. In a thread storing thread advancing machine having a pair of main rolls on nearly parallel axes over which thread is laid in closely spaced loops, an intermediate treatment roll whose periphery is engageable with at least some of the loops, and a pick-up and positioning means, said means located on both ends of said treatment roll each adapted to engage an adjacent loop during rotation of the roll and carry said loop onto the circumferential surface of said roll.

12. A treatment roll according to claim 11 wherein said pick-up and positioning means includes a deflector means for preventing pick-up of a loop at an undesired point in the travel of said pick-up and positioning means.

13. A treatment roll for a thread storing, thread advancing machine having a loop pick-up formation on at least one end thereof for engaging an adjacent loop and carrying it onto the circumferential surface of said roll, and a loop-positioning formation extending circumferentially around said surface adjacent the end on which said pick-up formation is applied and adapted to control the position of the end loop on said surface.

14. A treatment roll for a thread storing thread advancing machine having a loop pick-up formation on at least one end for engaging an adjacent loop and carrying it onto the circumferential surface of said roll, and a loop-positioning formation extending circumferentially around said surface adjacent the end carrying said pick-up formation.

15. A treatment roll for a thread storing, thread advancing machine having a loop pick-up formation on each end for engaging an adjacent loop and carrying it onto the circumferential surface of said roll and a loop-positioning formation extending around said surface adjacent each end, in combination with means to advance the thread in a loop formation to and from said treatment roll.

16. A treatment roll for a thread storing, thread advancing machine having a loop pick-up formation on at least one end and a flange extending around the circumferential surface of said roll adjacent said end, said flange being of generally trapezoidal shape in cross-section to facilitate positioning of the end loop on the circumferential surface of said roll.

17. A treatment roll according to claim 16 wherein said flange is obliquely gapped to allow the passage of a loop across said flange.

18. A treatment roll for a thread storing thread advancing machine having a loop pick-up and positioning means on at least one end for engaging an adjacent loop including a loop position control groove extending circumferentially around the cylindrical surface of said roll adjacent said end thereof in combination with means to advance the thread in a loop formation to and from said treatment roll.

19. A thread storing thread advancing machine having at least a pair of main rolls rotatable on nearly parallel axes and an intermediate treatment roll mounted for rotation so that its circumferential surface is engaged by at least some of the loops stored on said main rolls, the axis of rotation of said treatment roll being skewed with respect to the mean main roll axis so as to control the spacing of the loops engaged with the circumferential surface of said treatment roll whilst an end of said treatment roll has a loop pick-up and positioning means for engaging an adjacent advancing loop at the correct pick-up point and carrying it onto the circumferential surface of said treatment roll.

20. A thread storing thread advancing machine according to claim 19 wherein at least one of said main rolls has a thread positioning formation thereon for controlling the positions of loops running adjacent an end of said treatment roll to prevent rubbing of the thread against said treatment roll.

21. In a thread storing, thread advancing machine having a pair of main rolls on nearly parallel axes over which thread is laid in closely spaced loops, an intermediate treatment roll rotatable on an axis parallel to the mean axis of said main rolls and circumferentially engageable with at least some of the loops, said treatment roll having a loop pick-up formation on at least the lead-in end thereof, and a deflector located in the path of the loop adjacent the lead-in end of said treatment roll, said deflector being constituted by a rigid projection on said lead-in end projecting towards said adjacent thread loop to at least the plane containing the locus of said pick-up formation, and over an arc extending from a point immediately after the position of correct pickup at least to a point immediately after the position of incorrect pickup of the adjacent loop.

22. A treatment roll for a thread storing thread advancing machine having main rolls rotatable on nearly parallel axes for storing the thread in closely spaced loops each embracing at least all the main rolls wherein at least one end of the treatment roll has a loop pick-up formation thereon for positively engaging the adjacent approaching loop.

23. In a thread storing thread advancing machine having at least a pair of main rolls on nearly parallel axes over which thread is laid in closely spaced loops each embracing said main rolls, an intermediate treatment roll whose periphery is engageable with at least some of the loops, and a pick-up ledge projecting laterally from at least one end of the said treatment roll for engaging an adjacent loop and laying it on the roll circumference.

24. A thread storing thread advancing machine having at least a pair of main rolls on nearly parallel axes over which thread is laid in closely spaced loops each embracing all said main rolls, an intermediate treatment roll whose periphery is engageable with at least some of the loops during their passage from one main roll to an adjacent main roll, and a loop pick-up formation projecting laterally from at least one end of said treatment roll, said formation comprising a narrow ledge of increasing radius considered in the direction of rotation of said treatment roll and blending smoothly into the circumferential surface thereof.

25. In a thread storing thread advancing machine having a pair of main rolls on nearly parallel axes over which thread is laid in closely spaced loops, an intermediate treatment roll whose periphery is engageable with at least some of the loops and a narrow helical thread pick-up ledge blending smoothly into the circumferential surface of said roll on at least one end thereof the other end of said helical ledge projecting outwards from said roll end in a line substantially parallel to the axis of said treatment roll.

26. A thread storing, thread advancing machine comprising a treatment roll having a loop pick-up and positioning means thereon for engaging an adjacent loop, and means to advance the thread in a loop formation to and from said treatment roll.

27. The thread storing, thread advancing machine of claim 26, wherein said pick-up and positioning means include deflecting means for movement of the thread away from said pick-up and positioning means when the thread is not in proper engaging position.

References Cited by the Examiner
UNITED STATES PATENTS

| | | | |
|---|---|---|---|
| 2,596,520 | 5/52 | Barker | 68—205.1 X |
| 2,945,370 | 7/60 | Steiger | 62—205.1 |

IRVING BUNEVICH, *Primary Examiner.*

WALTER A. SCHEEL, *Examiner.*